US007843892B2

(12) United States Patent
Mehrabanzad et al.

(10) Patent No.: US 7,843,892 B2
(45) Date of Patent: Nov. 30, 2010

(54) REVERSE LINK POWER CONTROL (75) Inventors: Sepehr Mehrabanzad, Southborough, MA (US); Satish Ananthaiyer, Tewksbury, MA (US); Gopal Harikumar, Westford, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 470 days.

(21) Appl. No.: 10/835,537

(22) Filed: Apr. 28, 2004

(65) Prior Publication Data
US 2005/0243749 A1   Nov. 3, 2005

(51) Int. Cl.
H04B 7/216 (2006.01)
H04B 7/00 (2006.01)
(52) U.S. Cl. .............. 370/342; 370/310.2; 455/522
(58) Field of Classification Search .......... 370/342, 370/320, 331, 231, 332, 310, 345, 335, 349, 370/337, 318; 455/522, 343, 452.2
See application file for complete search history.

(56) References Cited

U.S. PATENT DOCUMENTS

| | | | |
|---|---|---|---|
| 4,031,469 A | 6/1977 | Johnson | |
| 4,072,900 A | 2/1978 | Ray | |
| 5,631,604 A | 5/1997 | Dent et al. | |
| 5,828,677 A | 10/1998 | Sayeed et al. | |
| 5,842,140 A | 11/1998 | Dent et al. | |
| 5,857,147 A | 1/1999 | Gardner et al. | |
| 5,884,187 A | 3/1999 | Ziv et al. | |
| 5,923,650 A * | 7/1999 | Chen et al. | ............... 370/331 |
| 5,982,760 A | 11/1999 | Chen | |
| 6,226,525 B1 | 5/2001 | Boch et al. | |
| 6,507,744 B1 | 1/2003 | Han et al. | |
| 6,567,420 B1 | 5/2003 | Tiedemann, Jr. et al. | |
| 6,633,552 B1 | 10/2003 | Ling et al. | |
| 6,697,378 B1 | 2/2004 | Patel | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,904,286 B1 * | 6/2005 | Dantu | ............... 455/452.2 |
| 6,965,564 B2 * | 11/2005 | Coffman | ............... 370/231 |
| 6,983,153 B2 | 1/2006 | Jain et al. | |
| 6,983,333 B2 | 1/2006 | Haberland | |
| 6,999,425 B2 | 2/2006 | Cheng et al. | |

(Continued)

OTHER PUBLICATIONS

U.S. Appl. No. 11/037,515, filed Jan. 18, 2005, including application as filed, (PTO website), and pending claims.

(Continued)

Primary Examiner—Charles N Appiah
Assistant Examiner—Kiet Doan
(74) Attorney, Agent, or Firm—Fish & Richardson P.C.

(57) ABSTRACT

This description describes examples of performing reverse link power control in a mobile network having a plurality of first modem devices that receive and transmit signals to wireless access terminals (ATs) and a second device in communication with the plurality of first devices. One of the first devices derives a first power control threshold (PCT) value for reverse link power of one of the access terminals (ATs) and the second device derives a second power control threshold (PCT) value for reverse link power of the one of the ATs. The second power control threshold (PCT) value is transmitted using a data traffic path and either the first PCT value or the second PCT value is selected.

30 Claims, 6 Drawing Sheets

U.S. PATENT DOCUMENTS

| | | | |
|---|---|---|---|
| 7,016,686 B2 | 3/2006 | Spaling et al. | |
| 7,031,141 B2 | 4/2006 | Kuriyama | |
| 7,082,317 B2 | 7/2006 | Yano et al. | |
| 7,085,570 B2 | 8/2006 | Tigerstedt et al. | |
| 7,120,134 B2 | 10/2006 | Tiedemann et al. | |
| 7,120,447 B1 | 10/2006 | Chheda et al. | |
| 7,136,353 B2 | 11/2006 | Ha et al. | |
| 7,136,666 B2 | 11/2006 | Charriere et al. | |
| 7,142,548 B2 | 11/2006 | Fong et al. | |
| 7,170,871 B2 | 1/2007 | Eyuboglu et al. | |
| 7,200,391 B2 | 4/2007 | Chung et al. | |
| 7,206,291 B2 | 4/2007 | Soldani et al. | |
| 7,242,958 B2 | 7/2007 | Chung et al. | |
| 7,248,875 B2 | 7/2007 | Schreuder et al. | |
| 7,248,889 B2 | 7/2007 | Schwarz et al. | |
| 7,268,674 B2 | 9/2007 | Bohler et al. | |
| 7,277,446 B1 | 10/2007 | Abi-Nassif et al. | |
| 7,299,278 B2 | 11/2007 | Ch'ng | |
| 7,305,241 B2 | 12/2007 | Hirvonen et al. | |
| 7,366,230 B2* | 4/2008 | Jonsson | 375/219 |
| 7,466,669 B2 | 12/2008 | Hosein | |
| 7,689,173 B2 | 3/2010 | Ihm et al. | |
| 7,729,243 B2 | 6/2010 | Ananthaiyer et al. | |
| 2001/0040880 A1* | 11/2001 | Chen et al. | 370/337 |
| 2002/0021687 A1 | 2/2002 | Toki et al. | |
| 2002/0072385 A1* | 6/2002 | Salvarani et al. | 455/522 |
| 2002/0111183 A1* | 8/2002 | Lundby | 455/522 |
| 2002/0186657 A1 | 12/2002 | Jain et al. | |
| 2002/0191567 A1 | 12/2002 | Famolari et al. | |
| 2002/0193118 A1 | 12/2002 | Jain et al. | |
| 2002/0196749 A1 | 12/2002 | Eyuboglu et al. | |
| 2003/0072294 A1* | 4/2003 | Wei et al. | 370/345 |
| 2003/0083092 A1* | 5/2003 | Kim et al. | 455/522 |
| 2003/0092463 A1* | 5/2003 | Charriere et al. | 455/522 |
| 2003/0100311 A1 | 5/2003 | Chung et al. | |
| 2004/0038697 A1* | 2/2004 | Attar et al. | 455/522 |
| 2004/0047305 A1* | 3/2004 | Ulupinar | 370/320 |
| 2004/0109424 A1 | 6/2004 | Chheda | |
| 2004/0110534 A1 | 6/2004 | Chung et al. | |
| 2004/0158790 A1 | 8/2004 | Gaal et al. | |
| 2004/0179494 A1* | 9/2004 | Attar et al. | 370/332 |
| 2004/0179525 A1 | 9/2004 | Balasubramanian et al. | |
| 2004/0185868 A1 | 9/2004 | Jain et al. | |
| 2004/0213182 A1 | 10/2004 | Huh et al. | |
| 2004/0228286 A1 | 11/2004 | Kim et al. | |
| 2004/0229604 A1 | 11/2004 | Fong et al. | |
| 2005/0047365 A1 | 3/2005 | Hong et al. | |
| 2005/0047375 A1 | 3/2005 | Kwon et al. | |
| 2005/0107090 A1 | 5/2005 | Hosein | |
| 2005/0107091 A1 | 5/2005 | Vannithamby et al. | |
| 2005/0124369 A1 | 6/2005 | Attar et al. | |
| 2005/0141454 A1 | 6/2005 | Jain et al. | |
| 2005/0169301 A1 | 8/2005 | Jain et al. | |
| 2005/0192042 A1 | 9/2005 | Au et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0250511 A1 | 11/2005 | Xiao et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0135173 A1 | 6/2006 | Vannithamby | |
| 2006/0135189 A1 | 6/2006 | Nagaraj et al. | |
| 2006/0159045 A1 | 7/2006 | Ananthaiyer et al. | |
| 2006/0176187 A1 | 8/2006 | Bohler et al. | |
| 2006/0215608 A1 | 9/2006 | Lee et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0081509 A1 | 4/2007 | Ihm et al. | |
| 2007/0097916 A1 | 5/2007 | Eyuboglu et al. | |
| 2007/0101015 A1 | 5/2007 | Larsson et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0202826 A1 | 8/2007 | Dean | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248035 A1 | 10/2007 | Sang et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0088146 A1 | 4/2009 | Wigren et al. | |
| 2009/0170547 A1 | 7/2009 | Raghothaman et al. | |
| 2010/0177731 A1 | 7/2010 | Ananthaiyer et al. | |

OTHER PUBLICATIONS

U.S. Appl. No. 11/114,422, filed Apr. 26, 2005, including application as filed, (PTO website), and pending claims.

U.S. Appl. No. 11/191,528, filed Jul. 28, 2005, including application as filed, (PTO website), and pending claims.

U.S. Appl. No. 11/965,070, filed Dec. 27, 2007, including application as filed, (PTO website), and pending claims.

3$^{rd}$ Generation Partnership Project "3GPP2", CDMA 2000 High Rate Packet Data Air Interface Specification, C.S0024-A, version 4.0, Oct. 25, 2002.

3rd Generation Partnership Project "3GPP2", CDMA 2000 High Rate Packet Data Air Interface Specification, C.S0024-A, version 1.0, Mar. 2004.

"Base Transceiver Station that Connects Mobile Phones to the Public Network", System Applications; Backbone Communications; Base Transceiver Stations (Mobile Telephony), NEC Electronics, Jun. 3, 2005, pp. 1-4, http://www.necel.com/en/solutions/applications/bs/bs.html.

U.S. Appl. No. 10/835,546, filed Apr. 28, 2004, including application as filed, (PTO website), and pending claims.

Office Action and response history as of Feb. 23, 2009 in U.S. Appl. No. 10/835,546.

Office Action and response history as of Feb. 23, 2009 in U.S. Appl. No. 11/037,515.

Office Action and response history as of Feb. 23, 2009 in U.S. Appl. No. 11/191,528.

Office Action and response history as of Aug. 9, 2009 in U.S. Appl. No. 11/114,422.

Office Action and response history as of Aug. 9, 2009 in U.S. Appl. No. 11/191,528.

Office Action and response history as of Sep. 24, 2009 in U.S. Appl. No. 11/037,515.
Office Action and response history as of Sep. 24, 2009 in U.S. Appl. No. 10/835,546.
Office Action and response history as of Apr. 29, 2009 in U.S. Appl. No. 11/114,422.
Office action from U.S. Appl. No. 11/037,515 mailed Jun. 15, 2009.
Advisory action mailed Jul. 16, 2009 and request for continued examination filed Jul. 21, 2009 from U.S. Appl No. 11/114,422.
Advisory action mailed Jun. 2, 2009 and request for continued examination filed Jul. 21, 2009 from U.S. Appl. No. 10/835,546.
3rd Generation Partnership Project "3GPP2", CDMA2000 High Rate Packet Data Interface Specification, TIA/EIA/IS-856A, C.S0024-A, Version 2, Jul. 2005 (1227 pages).
3rd Generation Partnership Project "3GPP2", CDMA2000 High Rate Packet Data Interface Specification, TIA/EIA/IS-856B, C.S0024-B, Version 1, Apr. 2006 (1623 pages).
3rd Generation Partnership Project "3GPP2", CDMA2000 High Rate Packet Data Interface Specification, TIA/EIA/IS-856B, C.S0024-B, Version 2, Mar. 2007 (1627 pages).
Charkravarth, S., "Algorithm for Reverse Traffic Rate Control for cdma2000 High Rate Packet Data Systems", GLOBECOM2001, San Antonion, Texas, Nov. 2001 (pp. 3733-3737).
3rd Generation Partnership Project "3GPP2", "TSG-C WG3, 1xEV-DO, Evaluation Methodology", 3GPP2 TSG-C Contribution C30-20031002-004, Oct. 2004 (194 pages).
Attar, Rashid A. and Eduardo Esteves, "A Reverse Link Outer-Loop Power Control Algorithm for CDMA2000 1xEV Systems", Proceedings of ICC, Apr. 2002.
Garg, Vijay K., "IS-95 CDMA and cdma 2000 Cellular/PCS Systems Implementation", Communication Engineering and emerging Technologies, Series Editor, Theodore S. Rappaport, Chapter 10, Prentice Hall, 1999. (Copy of Book Will Be Sent Via First Class to PTO).
Steele, Raymond and Lajos Hanzo, "Mobile Radio Communications", Second Edition, Second Edition, Second and Third Generation Cellular and WATM Systems, Pentech Press Limited, London, England, 1992. (Copy of Book Will Be Sent Via First Class to PTO).
Office Action and response history as of Feb. 12, 2009 in U.S. Appl. No. 10/835,546.
Office Action and response history as of Feb. 12, 2009 in U.S. Appl. No. 11/037,515.
Office Action and response history as of Feb. 12, 2009 in U.S. Appl. No. 11/114,422.
Office Action and response history as of Feb. 12, 2009 in U.S. Appl. No. 11/191,528.
Office Action and response history as of Jan. 6, 2010 in U.S. Appl. No. 11/037,515.
Office Action and response history as of Dec. 23, 2009 in U.S. Appl. No. 10/835,546.
Office Action and response history as of Dec. 9, 2009 in U.S. Appl. No. 11/114,422.
Office Action and response history as of Oct. 14, 2009 in U.S. Appl. No. 11/191,528.
U.S. Appl. No. 12/731,841, filed on Mar. 25, 2010, including application as filed, (PTO website), and pending claims.
Office Action and response history as of Mar. 4, 2010 in U.S. Appl. No. 11/114,422.
Office Action and response history as of Mar. 25, 2010 in U.S. Appl. No. 10/835,546.
Fish & Richardson P.C., Amendment in Reply to Action dated Oct. 14, 2009 in U.S. Appl. No. 11/191,528, filed on Jul. 6, 2010, 15 pages.
USPTO Non-Final Office Action in U.S. Appl. No. 12/731,841, dated Aug. 4, 2010, 12 pages.
USPTO Non-Final Office Action in U.S. Appl. No. 11/191,528, dated Sep. 2, 2010, 58 pages.
Fish & Richardson P.C., Appeal Brief in Reply to Action dated Mar. 25, 2010 in U.S. Appl. No. 10/835,546, filed on Jul. 26, 2010, 5 pages.

\* cited by examiner

| Message Type |
| --- |
| Total Message Length |
| Total # of Connections in message |
| BSCConnectionId_1 |
| BTSConnectionId_1 |
| PCT_1 |
| . |
| . |
| . |
| BSCConnectionId_96 |
| BTSConnectionId_96 |
| PCT_96 |

FIG. 6(a): Consolidated ABIS PCT signaling message.

| Message Type |
| --- |
| Total Message Length |
| Total # of Connections in message |
| BTSConnectionId_1 |
| PCT_1 |
| . |
| . |
| . |
| BTSConnectionId_96 |
| PCT_96 |

FIG. 6(b): Consolidated PCT signaling message from BIO-SC to RLM.

REVERSE LINK POWER CONTROL

BACKGROUND

This description relates to reverse link power control.

ACRONYMS AND ABBREVIATIONS

| | |
|---|---|
| 1x-EVDO | Evolution Data only, CDMA2000 family standard for high speed data only wireless internet access |
| AN | Access Network |
| API | Application Programmable Interface |
| ASIC | Application Specific Integrated Circuit |
| AT | Access Terminal |
| BIO-SC | Basic Input/Output - System Controller |
| CDMA | Code-Division Multiple Access |
| CPU | Central Processing Unit |
| CSM5500 ASIC | Qualcomm Inc. modem ASIC |
| CSM5500 Drivers | Qualcomm Inc. modem ASIC Driver and API |
| FCS | Frame Check Sequence |
| FER | Frame Error Rate |
| FLM | Forward Link Modem |
| IP | Internet Protocol |
| PCT | Power Control Threshold |
| $PCT_{RNi}$ | Power Control Threshold computed at ith RN |
| $PCT_{RNC}$ | Power Control Threshold computed at RNC |
| RAN | Radio Access Network |
| RL | Reverse Link or uplink - from mobile to base station. |
| RLILPC | Reverse Link Inner-Loop Power Control |
| RLM | Reverse Link Modem |
| RLOLPC | Reverse Link Outer-Loop Power Control |
| RLOLPC-RN | Power Control Algorithm running on RN |
| RLOLPC-RNC | Power Control Algorithm running on RNC |
| RN | Radio Node or Base Station |
| RN-BIO-SC | Radio Node BIO-SC Card or module |
| RNC | Radio Network Controller |
| RNSM | Radio Network Serving Module |
| RPC | Reverse Power Control |
| RTCHMO | Reverse Traffic Channel MAC Object |
| SDU | Selection and Distribution Unit |
| SINR | Signal-to-Interference Ratio ($E_b/I_t$) |

Capacity of a cellular system represents the total number of mobile users (access terminals or ATs) that can be supported by the system. Capacity can be an important factor for cellular service providers, since it directly impacts revenue. CDMA wireless communications systems offer improved capacity and reliable communications for cellular and PCS systems.

In a CDMA system, each AT transmit signal utilizes a different pseudo random sequence signal that appears as noise to other ATs. This enables many ATs to transmit on the same frequency. However, each AT's transmitted signal contributes to interference to the transmitted signal of all other users. Thus, the total number of users supported by the system is limited by interference. Therefore, reducing the amount of interference in a CDMA wireless communications system increases capacity.

A typical problem in a CDMA cellular environment is the near/far problem. This entails the scenario where the transmit power of an AT near the RN may drown out an AT which is far from the RN. This is effectively mitigated by controlling the transmit power of each AT via power control scheme implemented by the access network (AN). AN continuously commands each AT to increase or decrease its transmit power to keep them all transmitting at the minimal power required to achieved the configured error rate for the operating data rate and maintain the overall balance of the power while reducing the interference in the area of coverage.

In a CDMA 1x-EVDO system (see e.g., CDMA2000 High Data Rate Packet Data Air Interface Specification, 3GPP2 C.S0024, Version 4.0, Oct. 25, 2002), the reverse link operates in CDMA and hence reverse link power control is needed. The reverse link power control comprises of an open-loop power control (also called autonomous power control) and closed-loop power control. Open-loop power control is implemented in an AT, based on the received pilot-power of an RN. Closed-loop power control includes inner loop power control and outer loop power control, both of which are performed by the access network. Typical operation of a closed loop power control can be found in textbooks (see e.g., Vijay K. Garg, IS-95 CDMA and CDMA2000 Cellular/PCS Systems Implementation, Chapter 10, Prentice Hall, 1999, R. Steele. Mobile Radio Communications. Pentech Press, London, England, 1992, and Rashid A. Attar and Eduardo Esteves, A Reverse Link Outer-Loop Power Control Algorithm for CDMA2000 1xEV Systems, Proceedings of ICC, April 2002). Also, additional details can be found in e.g., U.S. Pat. No. 6,633,552, titled Method And Apparatus For Determining The Closed Loop Power Control Set Point In A Wireless Packet Data Communication System, and issued on Oct. 14, 2003, U.S. Pat. No. 6,507,744, titled Outer Loop Power Control Method During A Soft Handoff Operation, and issued on Jan. 14, 2003, and U.S. Pat. No. 5,884,187, titled Outer Loop Power Control Method During A Soft Handoff Operation, and issued on Mar. 16, 1999. A typical implementation is now described.

Figure 1:
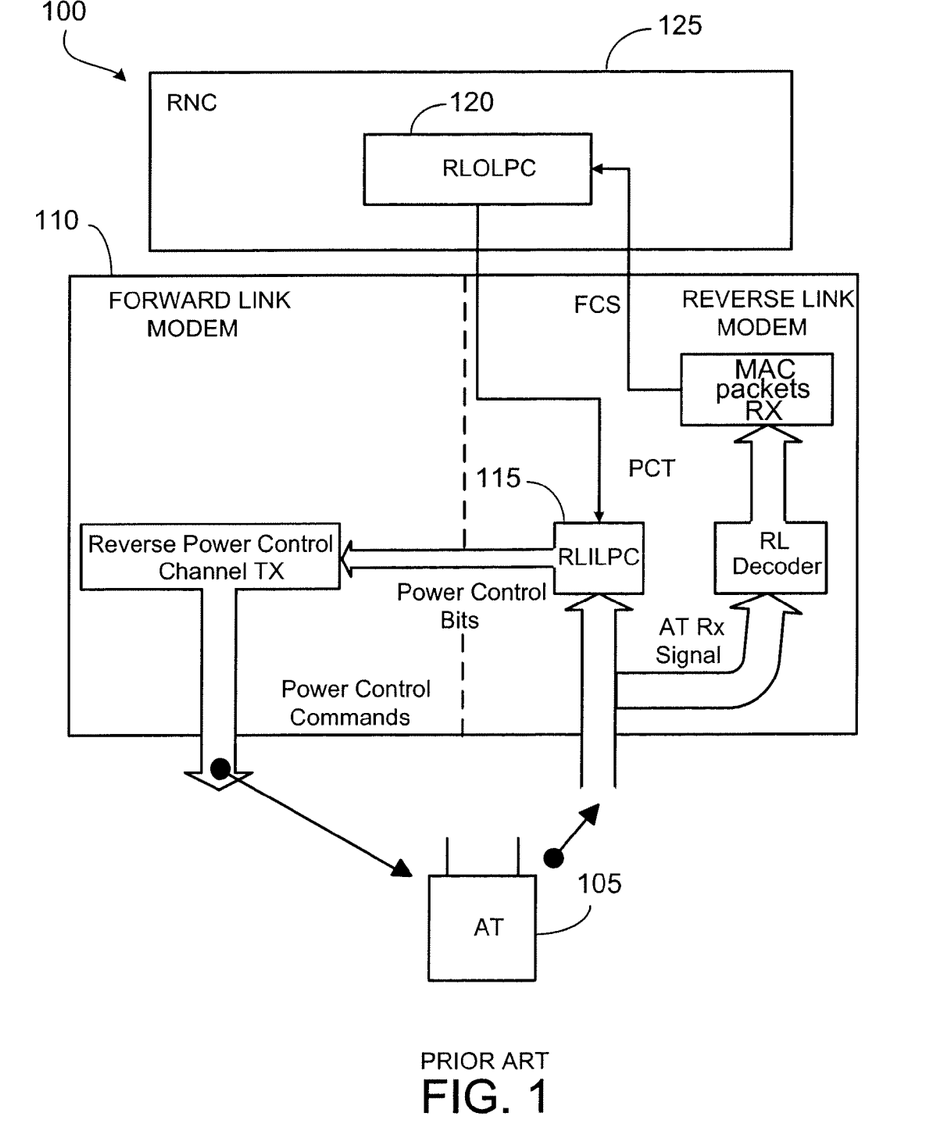
FIG. 1 is a block diagram illustrating reverse link power control in an example CDMA System.

FIG. 1 illustrates a system 100 implementing the basic closed loop power control operation. In closed loop power control, power adjustment is done at an AT 105 in accordance with the power control commands received from an RN 110 (also referred to as a base station 110). RN 110 sends up/down commands to each active AT (e.g., 105) to ensure that the AT transmit signal is received at the RN 110 at the lowest possible power required for the RN 110 to receive the data correctly at the operating rate.

In a reverse link inner-loop power control (RLILPC) mechanism 115, the reverse link signal to the interference-noise ratio (SINR) is continuously and frequently measured at a modem receiver of RN110. These frequent measurements track rapid channel variations of the link between the AT 105 and the RN 110 and facilitate accurate power control even when the AT 105 is in a deep fade. This measured of SINR is compared to a threshold value called 'power control threshold' (PCT). If the measured value is greater than PCTmax (=PCT+PCTDelta), the RPC bit is cleared. If the measured value is less than PCTmin (=PCT-PCTDelta), RPC bit is set. PCTDelta is a small value that provides an interval around the PCT. If the PCT is within this interval, the RPC bit status is unchanged from the previous value. Setting the RPC bits ('up decisions') commands AT 105 to increase its transmit power by a pre-determined step size, say 'x' dB. Clearing RPC bits ('down decisions') commands the AT 105 to decrease its transmit power by 'x' dB. The step size is negotiated a priori between RN 110 and AT 105.

Frame Error Rate (FER) is defined as a ratio of the bad frames to the total number of frames received by the RN 110. A frame with correct physical layer frame check sequence (FCS) is defined to be a good frame. In 1x-EVDO, the physical layer cyclic redundancy code (CRC) can be used to determine good or bad frames. In a reverse link closed outer-loop power control (RLOLPC) algorithm 120, the PCT is adaptively adjusted such that the configured target FER is achieved and maintained for the duration of the connection. (A target reverse link FER of 1% is considered typical for wireless networks). The RLOLPC algorithm 120 is implemented in a RNC 125.

It should be noted that there is another parameter beside FCS that is used in the voice application in CDMA system.

This parameter is called the quality metric, which is an indication of how "bad" the bad frame is. For voice, it may be beneficial to play out a bad packet in order to maintain the perception of a good voice quality. Therefore, even the bad packets are still sent to the RNC 125 from the RN 110 with the marking for a correct FCS and a quality metric. It's up to the RNC 125 to determine if the quality metric meets the criteria for the packet to be used even when the FCS is incorrect.

Typical operation of the RLOLPC algorithm 120 is described now. Upon reception of a RL frame with bad FCS, PCT is increased by a pre-set large value (e.g., 0.5 dB), which is termed a good frame PCT Delta. Upon reception of a RL frame with good FCS, PCT is decreased by a pre-set small value (e.g., 0.5 dB), which is termed a bad frame PCT Delta. Given the values of RL FER and the good frame PCT Delta, the bad frame PCT Delta value is computed as follows:

Bad Frame PCT Delta=Good Frame PCT Delta (1−RL FER)/RL FER (Note that this same equation can be used to compute the good frame PCT Delta given the values of RL FER and the bad frame PCT Delta.) Before a connection establishment, or if there is no data on a RL, the PCT is set to a pre-set high value to facilitate rapid reverse link acquisition. A new value of the PCT is computed upon reception of each good/bad RL frame and an updated PCT is input into the RN modem receiver and to the RLILPC algorithm 115.

Figure 2:
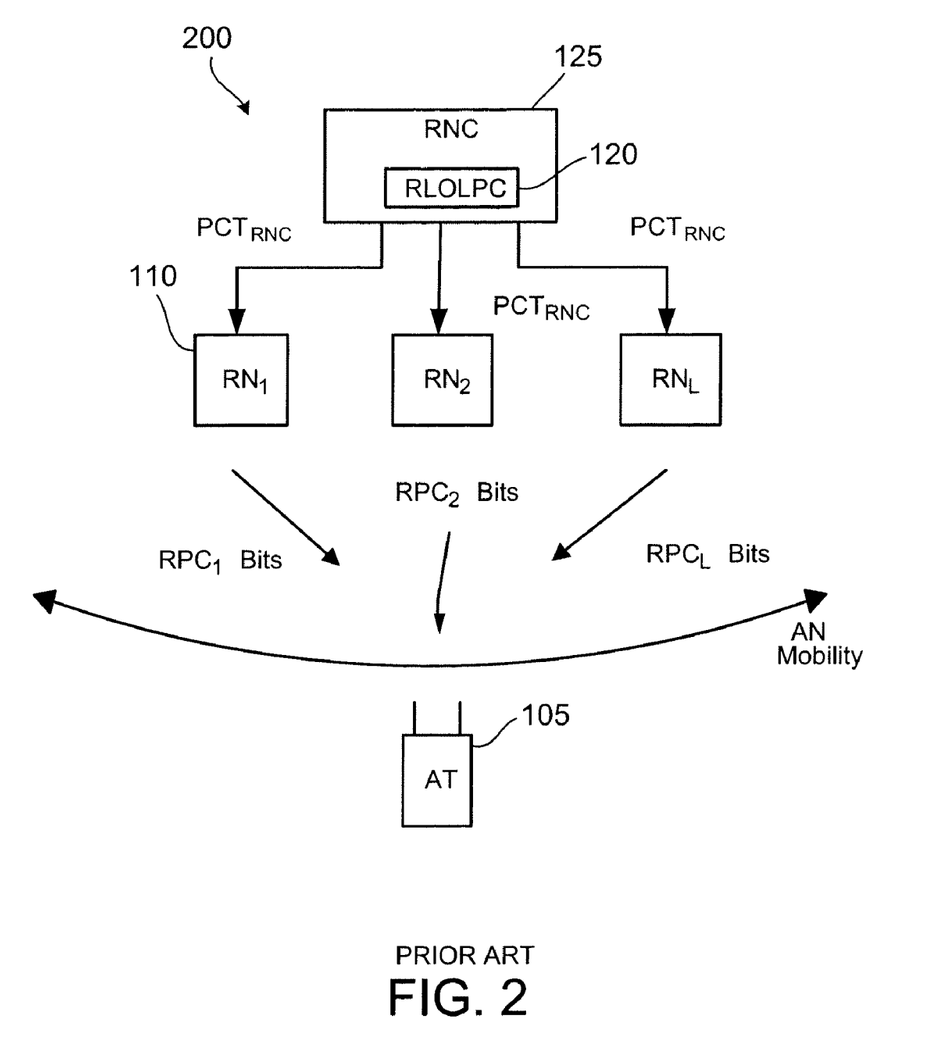
FIG. 2 is a block diagram illustrating reverse link power control in another example CDMA System.

FIG. 2 illustrates an example system 200, in which AT 105 is in a L-way soft hand-off (i.e., AT 105 is communicating with L RNs, e.g., $RN_1$, 110, $RN_2$ 205, and $RN_L$ 210, at the same time). The selection and distribution unit (SDU) (not shown) at the RNC 125 determines which received frame from all the different 'legs' should be used. In addition it determines if correct or incorrect received frame indication needs to be send to the RLOLPC algorithm 120 on each frame boundary. The RLOLPC algorithm 120 uses this information to compute the overall PCT for the AT 105. This PCT value is sent to all L RNs involved in the soft hand-off.

SUMMARY OF INVENTION

In one aspect, there is a method of performing reverse link power control in a mobile network having a plurality of first modem devices that receive and transmit signals to wireless access terminals (ATs) and a second device in communication with the plurality of first devices. The method includes transitioning execution between a first and a second loop to control reverse link power of one of the ATs, the transition being based on a state of a connection. The first control loop executes at one of the first devices and the second loop executes at the second device.

Other examples can include one or more of the following features. The transitioning can include synchronizing between the first control loop and the control loop based on a change of the state. The change of the state of the connection can include transitioning from the connection not in handoff to the connection in soft handoff. The method can include transmitting to the second control loop a value for a power control threshold calculated by the first control loop. The transmitting can include transmitting the value for the power control threshold during transmission of handoff-related data. The method can include deriving a power control threshold using the first or second control loop.

The method can include generating, by the one of the first devices, an indicator representing quality of a signal received from the one of the ATs, and calculating a power control threshold using the indicator. The method can include preventing transmission of a packet from the one of the first devices to the second device if the packet is associated with a bad indication. The method can include transmitting the bad indication to the second device. The method can include determining good or bad indication of a packet using a cyclic redundancy code (CRC) associated with the packet. The state of the connection can include the connection not in handoff, the connection in softer handoff, or the connection in soft handoff. The method can include communicating between the first devices and the second device using Internet Protocol (IP) or asynchronous transfer mode (ATM).

In another aspect, there is a method of performing reverse link power control in a mobile network having a plurality of first modem devices that receive and transmit signals to wireless access terminals (ATs) and a second device in communication with the plurality of first devices. The method includes deriving, by one of the first devices, a first power control threshold (PCT) value for reverse link power of one of the access terminals (ATs) and deriving, by the second device, a second power control threshold (PCT) value for reverse link power of the one of the ATs. The method also includes transmitting the second power control threshold (PCT) value using a data traffic path and selecting the first PCT value or the second PCT value.

Other examples can include one or more of the following features. The transmitting can include transmitting using User Datagram Protocol or Generic Route Encapsulation protocol. The transmitting can include transmitting the second power control threshold (PCT) value based on a state of a connection. The state of the connection can include the connection in soft handoff. The second PCT value can be selected when the second PCT value is received at the one of the first devices. The first PCT value can be selected when a connection is not in handoff or a connection is in softer handoff. The second PCT value can be selected when a connection is in soft handoff.

The method can include generating, by the one of the first devices, an indicator representing quality of a signal received from the one of the ATs, and calculating the first PCT and the second PCT using the indicator. The method can include preventing transmission of a packet from the one of the first devices to the second device if the packet is associated with a bad indication; and transmitting the bad indication to the second device. The method can include determining good or bad indication of a packet using a cyclic redundancy code (CRC) associated with the packet. The method can include communicating between the first devices and the second device using Internet Protocol (IP) or asynchronous transfer mode (ATM).

In another aspect, there is a system for performing reverse link power control in a radio access network (RAN). The system includes a first modem device and a second device in communication with the first device over a network. The first modem device receives and transmits signals to a wireless access terminal (AT). The first device is configured to execute a first loop to control reverse link power of the AT based on a first state of a connection. The second device is configured to execute a second loop to control reverse link power of the AT based on a second state of the connection and to synchronize the second loop with the first loop during a transition from the first state to the second state.

Other examples can include one or more of the following features. The first state of the connection can include the connection not in handoff or the connection in softer handoff. The second state of the connection can include the connection in soft handoff. The second device can be configured to obtain a power control threshold calculated by the first control loop. The second device can be configured to obtain a power control threshold calculated by the first control loop during transmission of handoff-related data. The first device can be configured to derive a power control threshold using the first control loop.

The first device can be configured to generate an indicator representing quality of a signal received from the AT and to calculate a power control threshold using the indicator. The first device can be configured to prevent transmission of a packet from the first device to the second device if the packet is associated with a bad indication and to transmit the bad indication to the second device in place of the packet. The first device can be configured to determine good or bad indication of a packet using a cyclic redundancy code (CRC) associated with the packet. The first device and the second device can communicate using Internet Protocol (IP) or asynchronous transfer mode (ATM).

In another aspect, there is a system for performing reverse link power control. The system includes a first modem device and a second device in communication with the first device over a network. The first modem device receives and transmits signals to a wireless access terminal (AT). The first device is configured to derive a first power control threshold (PCT) value for reverse link power of an AT. The second device is configured to derive a second power control threshold (PCT) value for reverse link power of the AT and to transmit the second power control threshold (PCT) value to the first device using a data traffic path.

Other examples can include one or more of the following features. The first device can be configured to transmit the second power control threshold (PCT) value to the first device over the data traffic path using User Datagram Protocol or Generic Route Encapsulation protocol. The first device can be configured to select the first PCT value or the second PCT value. The first device can be configured to select the second PCT value when the second PCT value is received at the first device. The first device can be configured to select the first PCT when the connection is not in handoff or the connection is in softer handoff. The first device can be configured to select the second PCT value when the connection is in soft handoff.

The first device can be configured to generate an indicator representing quality of a signal received from the AT and to calculate the first PCT using the indicator. The first device can be configured to prevent transmission of a packet from the one of the first devices to the second device if the packet is associated with a bad indication and to transmit the bad indication to the second device. The first device can be configured to determine good or bad indication of a packet using a cyclic redundancy code (CRC) associated with the packet. The first device and the second device can communicate using Internet Protocol (IP) or asynchronous transfer mode (ATM).

In another aspect, there is a computer program product, tangibly embodied in an information carrier, for performing reverse link power control in a mobile network having a plurality of first modem devices that receive and transmit signals to wireless access terminals (ATs) and a second device in communication with the plurality of first devices. The computer program product includes instructions being operable to cause data processing apparatus to transition execution between a first and a second loop to control reverse link power of one of the ATs, where the transition is based on a state of a connection, and the first control loop executes at one of the first devices and the second loop executes at the second device.

Other examples can include one or more of the following features. The computer program product of can include instructions operable to cause the data processing apparatus to synchronize between the first control loop and the control loop based on a change of the state. The change of state of the connection can include transitioning from the connection not in handoff to the connection in soft handoff.

The computer program product can include instructions operable to cause the data processing apparatus to transmit to the second control loop a value for a power control threshold calculated by the first control loop. The computer program product can include instructions operable to cause the data processing apparatus to transmit the value for the power control threshold during transmission of handoff-related data.

The computer program product can include instructions operable to cause the data processing apparatus to derive a power control threshold using the first or second control loop. The computer program product can include instructions operable to cause the data processing apparatus to generate, by the one of the first devices, an indicator representing quality of a signal received from the one of the ATs, and calculate a power control threshold using the indicator. The computer program product can include instructions operable to cause the data processing apparatus to prevent transmission of a packet from the one of the first devices to the second device if the packet is associated with a bad indication, and transmit the bad indication to the second device. The computer program product can include instructions operable to cause the data processing apparatus to determine good or bad indication of a packet using a cyclic redundancy code (CRC) associated with the packet. The state of the connection can include the connection not in handoff, the connection in softer handoff, or the connection in soft handoff. The computer program product can include instructions operable to cause the data processing apparatus to communicate between the first devices and the second device using Internet Protocol (IP) or asynchronous transfer mode (ATM).

In another aspect, there is a computer program product, tangibly embodied in an information carrier, for performing reverse link power control in a mobile network having a plurality of first modem devices that receive and transmit signals to wireless access terminals (ATs) and a second device in communication with the plurality of first devices. The computer program product includes instructions being operable to cause data processing apparatus to derive, by one of the first devices, a first power control threshold (PCT) value for reverse link power of one of the access terminals (ATs), derive, by the second device, a second power control threshold (PCT) value for reverse link power of the one of the ATs, transmit the second power control threshold (PCT) value using a data traffic path, and select the first PCT value or the second PCT value.

Other examples can include one or more of the following features. The computer program product can include instructions operable to cause the data processing apparatus to transmit using User Datagram Protocol or Generic Route Encapsulation protocol. The computer program product can include instructions operable to cause the data processing apparatus to select the second PCT value when the second PCT value is received at the one of the first devices. The computer program product can include instructions operable to cause the data processing apparatus to select the first PCT value when a connection is not in handoff or a connection is in softer handoff. The computer program product can include instructions operable to cause the data processing apparatus to select the second PCT value when a connection is in soft handoff. The computer program product can include instructions operable to cause the data processing apparatus to generate, by the one of the first devices, an indicator representing quality of a signal received from the one of the ATs, and calculate the first PCT and the second PCT using the indicator.

The computer program product can include instructions operable to cause the data processing apparatus to prevent transmission of a packet from the one of the first devices to the second device if the packet is associated with a bad indication and transmit the bad indication to the second device. The computer program product can include instructions operable to cause the data processing apparatus to determine good or bad indication of a packet using a cyclic redundancy code (CRC) associated with the packet. The computer program product can include instructions operable to cause the data processing apparatus to communicate between the first devices and the second device using Internet Protocol (IP) or asynchronous transfer mode (ATM).

Among the advantages of the system are one or more of the following. By reducing RNC-RN signaling (e.g., sending PCT only for connections in handoff), there is a reduced backhaul bandwidth consumption. Similarly, by reducing RN-RNC data traffic (e.g., sending only an indication of bad frames to a RNC, excluding the payload), there is a reduced backhaul bandwidth consumption. Other features and advantages will become apparent from the following description and from the claims.

DESCRIPTION

Figure 3:
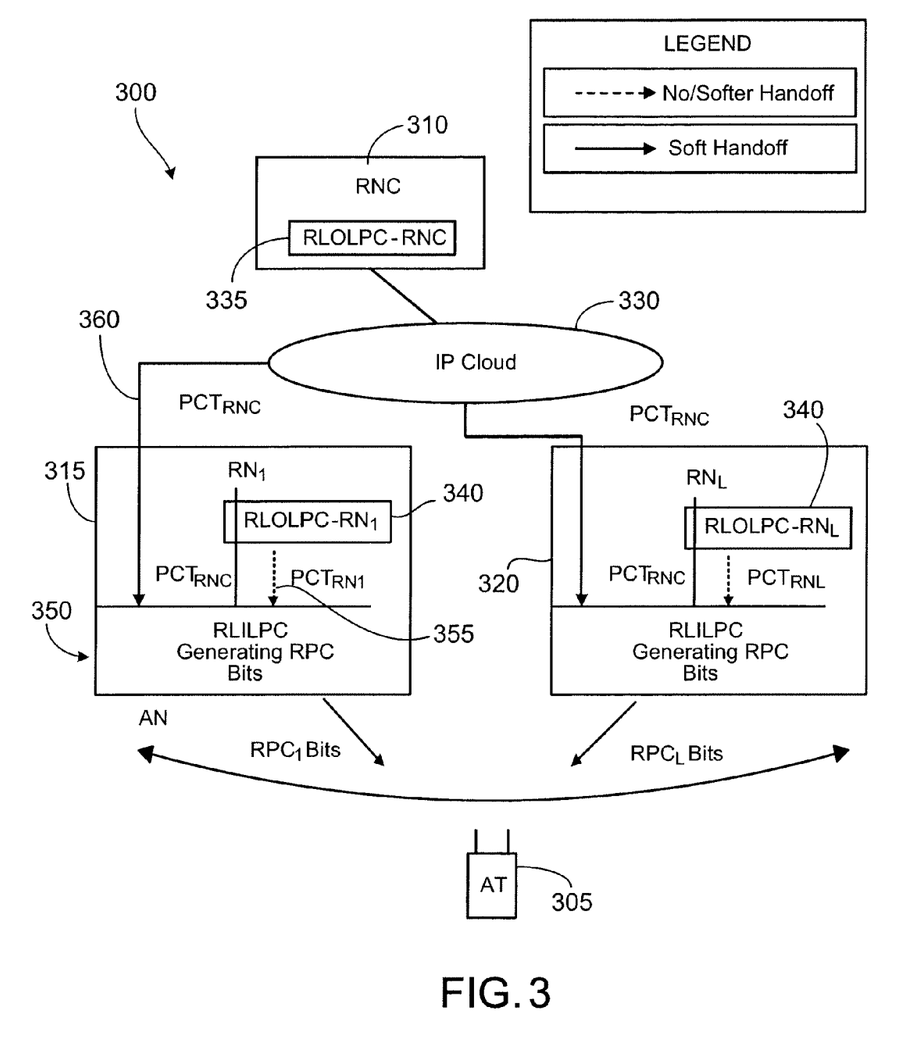
FIG. 3 is a block diagram illustrating a system for distributed reverse link power control.

FIG. 3 illustrates a 1xEV-DO Radio Access Network (RAN) 300. The RAN 300 can be built entirely on IP technology, all the way from an AT 305 to a network connection to the Internet (e.g., via a RNC 310), thus taking full advantage of the scalability, redundancy, and low-cost of IP networks. The entire service area of a wireless access provider may comprise one or more IP RANs 300. Each IP RAN 300 can include many radio nodes (RNs), e.g., RN 315 and RN 320, and one or more radio network controllers (RNC), e.g., 310. The RNs 315 and 320 and the RNC 310 are connected over an IP (backhaul) network 330, which supports many-to-many connectivity between RNs 315 and 320 and RNC 310, and any other RNs and RNCs that may be part of RAN 300.

In presence of an IP connectivity between RNs 315 and 320 and RNC 310, transmission of PCT values as IP packets over IP backhaul 330 to connections on all RNs can generate a high amount of signaling message transmission. Each RNC could potentially support 100s of RNs and the signaling message overhead for PCT message transmission could be a significant portion of the overall backhaul traffic. System 300 implements a distributed approach to reduce the signaling messaging over IP backhaul 330, as described in more detail below, since signaling messaging has priority over data, which can cause significant reduction of data throughput to the end user.

In system 300, the RLOLPC functionality (e.g., updating the PCT) is distributed across RNs 315 and 320 and RNC 310. This distribution is accomplished by using a RLOLPC-RNC module 335 for RLOLPC functionality in RNC 310 and a RLOLPC-RN module 340 for RLOLPC functionality in RNs 315 and 320.

In a general overview, system 300 uses RLOLPC-RNC module 335 or RLOLPC-RN module 340 based on the handoff state of AT 305. In general, handoff represents the migration of a connection of AT 305 from one RN to another RN. When AT 305 is in communication with only one RN, for example RN 315, then AT 305 is not in handoff. When AT 305 migrates, for example, from RN 315 to RN 320, then AT 305 is in handoff. Soft handoff represents the overlapping coverage area of RNs 315 and 320, where AT 305 can communicate with both RN 315 and RN 320 at the same time. A soft handoff is sometimes referred to as a make before break connection. Softer handoff represents the overlapping coverage area between different sectors for the same RN.

If the AT 305 is not in handoff or is in softer handoff, the RLOLPC-RN module 340 of the serving RN handles the RLOLPC functionality. For example, if AT 305 is in communication only with RN 315 or is in a coverage area of RN 315 where AT 305 can communicate with multiple sectors of RN 315, then the RLOLPC-RN module 340 of the RN 315 handles the RLOLPC functionality. As described above, the RLOLPC algorithm increases or decreases the PCT value based on whether the reverse link receives good or bad frame input. The RLOLPC-RN module 340 can determine bad or good frame input locally at the RN 315 by using the CRC state. Because system 300 is a 1xEV-DO system, there is no quality metric assigned to each received packet. Since the packet of data is either good or bad, the CRC state indicates the usefulness of the packet. In this scenario, the RLILPC 350 receives the PCT locally (shown by arrow 355) and not from the RNC 310 (shown by arrow 360). Because no information has to be transferred between RN 315 and RNC 310, this local PCT calculation advantageously generates bandwidth savings on both reverse and forward links in backhaul 330. Also, there is a saving of processor bandwidth in RNC 310, since it does not have to execute an RLOLPC algorithm for this connection.

If the AT 305 is in soft handoff, the RLOLPC-RNC module 335 of the serving RNC handles the RLOLPC functionality. For example, if AT 305 is in communication with both RN 315 and RN 320, then the RLOLPC-RNC module 335 of the RNC 310 handles the RLOLPC functionality. In this scenario, like the scenario above, the RN (e.g., 315 and/or 320) receiving the packet determines whether it is a good or bad frame using the CRC state. If the RN (e.g., 315 and/or 320) determines the packet is a good frame, the RN forwards the packet to RNC 310. If the RN (e.g., 315 and/or 320) determines the packet is a bad frame, the RN does not forward the packet to RNC 310. Instead, the packet is dropped at the RN and an indication of a bad frame is sent to RNC 310. This indication is smaller than sending the entire received packet, hence less traffic is generated on the backhaul 330.

An SDU in RNC 310 determines which leg (e.g., the communication between AT 305 and RN 315 or the communication between AT 305 and RN 320) is providing the good frame, if any, and inputs the RLOLPC-RNC module 335 accordingly. The RLOLPC-RNC module 335 generates the PCT and sends it to the applicable RNs using, for example, a packet. The PCT packet may be treated as a signaling packet and sent using a signaling path, (e.g., using Transmission Control Protocol (TCP)). This signaling path can be slower but more reliable than the data traffic path. In another example, the PCT packet can be treated as a data packet and sent using a data traffic path (e.g., using User Datagram Protocol (UDP) or Generic Route Encapsulation (GRE) protocol). This data traffic path can be faster but less reliable than the signaling path. For each RN, the PCT for all connections on each carrier in that RN can be multiplexed into one packet and sent to the respective RN. Also, the PCT values for all of the RNs can be multiplexed into one packet and multicast to all of the RNs. These examples of using a single packet advantageously saves bandwidth on the forward link of the backhaul 330. Sending only a bad frame indication instead of the entire bad frame with appropriate markings advantageously generates bandwidth savings on the backhaul 330. Also, there is a saving of processor bandwidth in the RNs since the RLOLPC-RN module 340 is not run for this connection.

System 300 coordinates RLOLPC between the RLOLPC-RNC module 335 and the RLOLPC-RN module 340 for PCT input into the RLILPC 350 as the connection (with AT 305) enters handoff or exits handoff. System 300 coordinates RLOLPC in a number of ways. One way to coordinate RLOLPC is to transition the RLOLPC from RN to RNC and back to RN as connection (with AT 305) enters and exists handoff and to synchronize the RLOLPC to generate the same PCT while RLOLPC is transitioned.

To start the description of this process, the AT 305 is not in handoff and is communicating with RNC 310 only through RN 315. At some point, as AT 305 moves closer to RN 320, AT 305 enters an area where AT 305 can communicate with RNC 310 through both RN 315 and RN 320 (a soft handoff condition). Once RNC 310 detects this condition, which requires the connection to enter into handoff, the RNC 310 requests the channel-element resources from target RN 320 and has to update the source RN 315 with the number of legs in the handoff (in this case 2). During these transactions, source RN 315 responds with the latest value of PCT to initialize the RLOLPC-RNC module 335 in RNC 335. During resource allocation on target RN, the RNC 335 uses this PCT value to prime the target RN RLILPC 350. Once initialized, the RLOLPC-RNC module 335 determines the PCT and transmits the value to the RNs 315 and 320 s described above. This transmission of the PCT from the RLOLPC-RN 340 to the RLOLPC-RNC 335 enables the RLOLPC-RNC 335 to become synchronized with the RLOLPC-RN 340. The RLOLPC-RNC 335 can then take over the RLOLPC functionality seamlessly from the RLOLPC-RN 340. Once RNC detects the condition that AT needs to leave the handoff state, it has to update the last remaining leg with the number of handoff legs. The latest value of PCT can be also sent to RN at this time, before the periodic update time. Once the RN receives the above message, the RN switches to run RLOLPC (using the RLOLPC-RN 340) and generates the PCT locally (e.g., at the RN) for this connection.

Another way to coordinate RLOLPC is to simultaneously run RLOLPC in both RLOLPC-RN 340 and RLOLPC-RNC 335. Unlike the above examples, in this scenario, the RNs send a bad frame indication to the RNC 310, even when in a no handoff state, because RLOLPC-RNC 335 continuously calculates PCT, regardless of the handoff state. In this way, both RLOLPC-RN 340 and RLOLPC-RNC 335 are synchronized with each other. When, however, the AT 305 is in a no handoff or softer handoff state, RNC 310 does not transmit its PCT value to the RNs. RNs 315 and 320 are configured such that when they do not receive a PCT value from the RNC 310 they use the PCT value calculated by the RLOLPC-RN module 340. When the AT 305 moves into a soft handoff state, RNC 310 starts transmitting the PCT value calculated by RLOPC-RNC module 335. When the RNs 315 and 320 receive a PCT value from the RNC 310, they use that received PCT value instead of their locally calculated value. In other words, a PCT value received from the RNC 310 overwrites, or has higher priority than, the PCT value calculated by the local RLOLPC-RN module 340.

In some examples, the updated PCT is computed immediately after reception of the FCS information. However, since RLOLPC is a slow control loop, other examples input the PCT value to a RN modem receiver only once every 'N' RL frames. N represents a configurable parameter. In one example, N is set to 4 RL frames. Typically, each 1x-EVDO RL frame duration is 26.66 ms (see e.g., CDMA2000 High Data Rate Packet Data Air Interface Specification, 3GPP2 C.S0024, Version 4.0, Oct. 25, 2002) and hence an update period where N is set to 4 is 106.64 ms. This characteristic of the RLOLPC algorithm also facilitates transmission of consolidated PCT messages as opposed to individual PCT messages from RNC 310 (e.g., single PCT packets described above).

Figure 4:
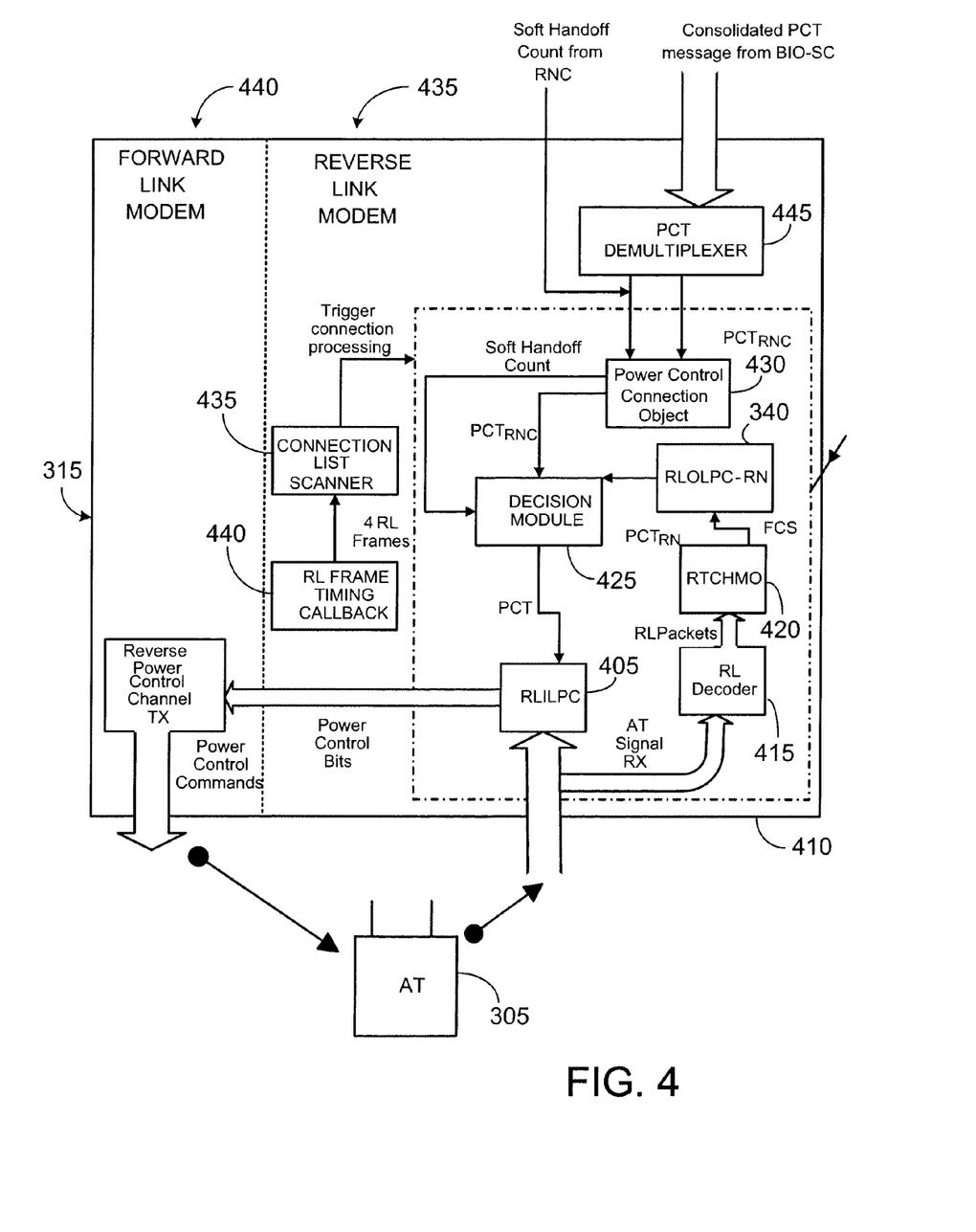
FIG. 4 is a block diagram depicting an example system for reverse link power control on the RN.
Figure 5:
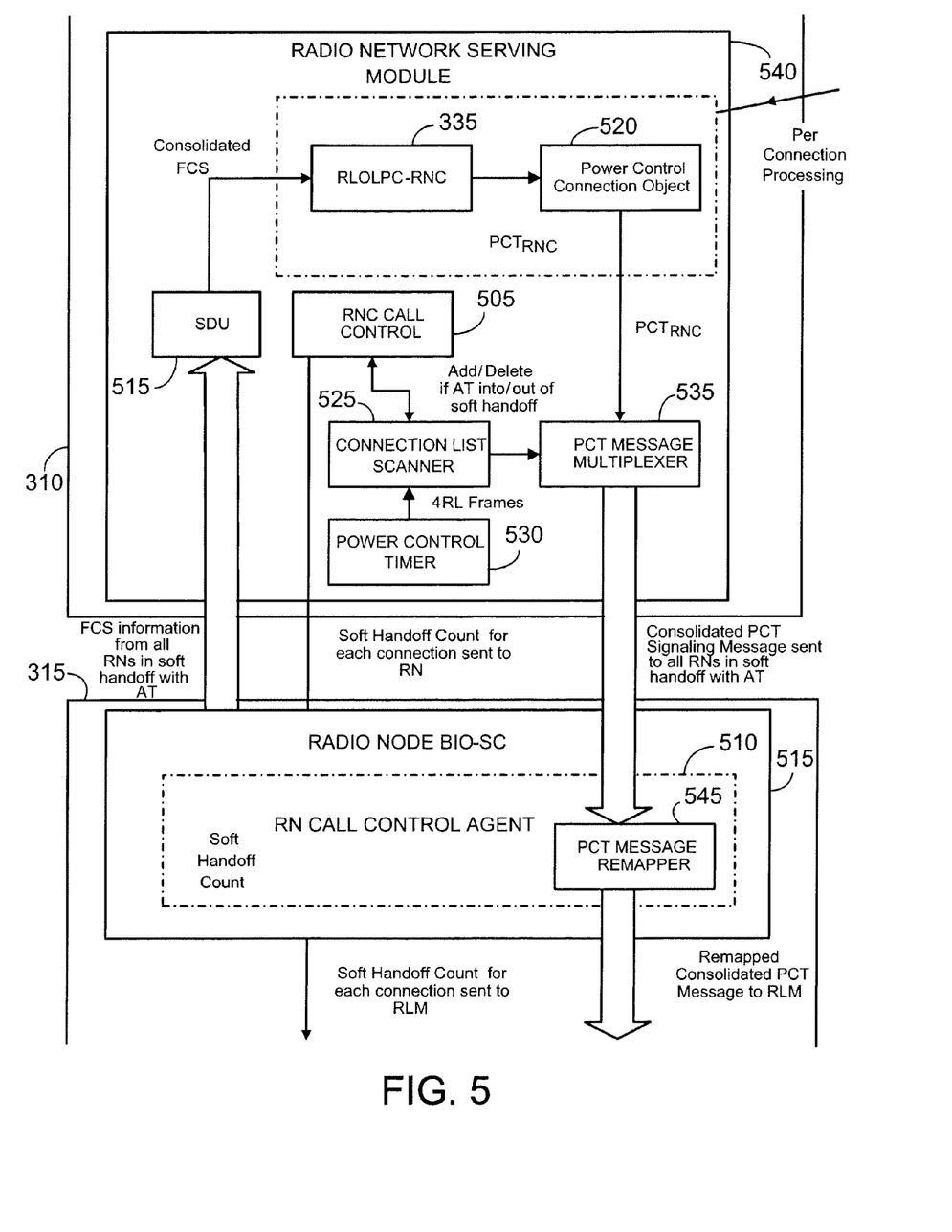
FIG. 5 is a block diagram depicting an example system for reverse link power control on the RNC.

FIGS. 4 and 5 illustrate the modules of RN 315 and RNC 310 in more detail. The modules that are running on RN 315 are shown in FIG. 4. The modules that are running on RNC 310 are shown in FIG. 5. In one example, the power control function at RN 315 is distributed across a BIO-SC 515 and modem line cards. The modem line card contains both a FLM module 440 and a RLM module 435. In one example, the power control function at the RNC 310 resides on a RNSM card 540.

In the illustrated example, the inner loop power control module (RLILPC) 405 exists in a modem receiver 410 of the RN 315. In the distributed approach for reverse link power control described above, the RLOLPC functionality is distributed across RNs and RNC based on all different handoff scenarios of the mobile (e.g., AT 305). In describing FIGS. 4-6, the following handoff scenarios will be used, and referred to using its respective preceding letter.

(a) Connection (AT) is not in hand-off.
(b) Connection (AT) is in softer hand-off but not in soft hand-off.
(c) Connection (AT) is in softer and soft hand-off.
(d) Connection (AT) is in soft hand-off.

Handoff areas are located at the cell site boundaries. As described above, an AT 305 is said to be in 'soft' handoff if the AT 305 is able to see pilot signals from multiple RNs (e.g., both RN 315 and RN 320). An AT 305 is said to be in 'softer' handoff if the AT is able to see pilot signals from multiple sectors of a single RN. The AT 305 reports the pilots seen to the AN (e.g., RAN 300) as part of the route update message (see e.g., CDMA2000 High Data Rate Packet Data Air Interface Specification, 3GPP2 C.S0024, Version 4.0, Oct. 25, 2002). At the AN, a determination of whether the AT 305 is in no/soft/softer handoff is made based on the number of pilots and corresponding PN offsets. For example: An AT is said to be in 'three-way' soft handoff if the AN resolves PN offsets of the three pilots reported in the route update message that corresponds to the three different RNs. For example, if the system is compliant with CDMA2000 High Data Rate Packet Data Air Interface Specification, 3GPP2 C.S0024, Version 4.0, dated Oct. 25, 2002, the maximum number of pilots allowed in soft/softer handoff is 6. The number of pilots in soft handoff is referred to as the "soft handoff count". During connection establishment, the RNC call control module 505 passes Soft Handoff count down to its peer, a call control agent (CCA) module 510 on each RN in the handoff. This facilitates connection resource allocation at RNs.

As described above, the power control for softer handoff can be identical to the no hand-off since the received signals of a specific AT 305 from different sectors on the specific RN are combined before generating FCS on that specific RN. Hence, there is no RNC involvement for softer handoff.

The techniques described herein distinguish the fact that for situations (a) and (b), the updated PCT provided by RLOLPC-RN module 340 is sufficient without any necessity of RNC 310 communicating with a RN (e.g., RN 315). For situations (c) and (d), updated PCT from RLOLPC-RNC module 335 is sent to all RNs in the handoff (e.g., RN 315 and RN 320) and this overrides the updated PCT from the RLOLPC-RN 340.

Power Control when AT is not in Soft Handoff

FIG. 4 illustrates portions of RN 315, highlighting power control operation for scenarios (a) and (b). A reverse link modem 435 receives signals transmitted by the AT 305. A received signal from the AT 305 is decoded and MAC packets are generated by the modem receiver. This is represented by a RL Decoder block 415. A RTCHMO block 420 receives FCS and reverse rate indication of the received RL frame. The FCS information is input to the RLOLPC-RN module 340 and the updated PCT is computed. Updated PCT is input to a Decision Module 425. Soft Handoff Count is a key parameter that is used by the Decision Module 425 to determine whether the AT 305 is in soft handoff. For no handoff or softer handoff, the value of Soft Handoff Count=1. In one example, this soft handoff count parameter is sent from the CCA 510 to a power control connection object module 430 at the RLM 435 during power control connection resource allocation.

A connection list scanner module 435 scans a linked list of all active connections on the RN 315. Entries to this list are added/deleted when a connection is opened/closed with an AT. The scan list is updated from interaction with the RN call control agent module 510. Updates from the call control agent 510 are based on messages from its peer RNC call control 505.

In one example, upon reception of a timing callbacks (e.g., 4 RL frames detected by RL frame timing callback module 440) the entire active connection list is scanned. For each connection, the decision module 425 chooses appropriate PCT depending on the soft handoff count value. In cases (a) and (b), Soft Handoff Count=1 and hence $PCT_{RN}$ is chosen (e.g., the PCT value calculated by the RLOLPC-RN module 340). This value is used as the current input to RLILPC 405.

Using the latest PCT value, the RLILPC algorithm 405 determines RPC bits and transmits them to the mobile 305 on a forward link MAC channel. Since there is no involvement of RNC signaling, delays on the backhaul 330 are minimized and bandwidth conserved, as described above. Minimization of delay from the time the updated PCT is determined to the time it is used by RLILPC advantageously offers better power control on the reverse link. This can also help improve capacity on the forward link for high data rate wireless systems.

Power Control when AT is in Soft Handoff

FIG. 5 illustrates portions of RNC 310 and RN 315, highlighting power control operation for scenarios (c) and (d). In these scenarios, the AT is power controlled from the RNC 310. An SDU algorithm 515 running on the RNC 310 processes FCS information received from all RNs that are involved in the soft hand-off and generates the consolidated FCS. If a good frame is received from at least one RN, then consolidated FCS is considered good. Bad FCS indication is generated if bad frames are received from all RNs.

The RLOLPC-RNC module 335 gets FCS information from the SDU 515 and determines adaptive PCT that satisfies the FER criterion (RL FER is a configurable parameter. See the description above about the soft handoff count parameter). This value is stored in the power control connection object 520 for the specific connection.

A connection list scanner module 525 scans the linked list of active connections that are in soft handoff. Entries to this list are added/deleted when an AT moves in and out of soft handoff. The scan list is updated from an interaction with the RNC call control module 505. Updates from the call control 505 are based on soft handoff count information.

Upon firing of a power control timer 530 (e.g., period=4 RL frames), the connection list is scanned. The RN-IP address and channel record 2-tuple uniquely identifies each RN. For each soft handoff leg (RN) in that connection, a PCT multiplexer 535 updates a consolidated PCT message with a new PCT. The structure of the consolidated PCT message is given in FIG. 6(a).

Once all connections in the list are scanned, PCT messages are transmitted to all RNs. In one example, for load balancing amongst competing tasks on the RNSM 540, the connection list scanner 525 scans only a subset of connections in the connection list. This scanning size can be a configurable parameter on the RNC 310 and in one example is set to 960.

In one example, the signaling PCT messages are sent to the RN 315 over the IP backhaul 330 using proprietary ABIS signaling protocol. In this example, there is no acknowledgement provided by RN 315 to RNC 310. PCT values are quasi real-time and hence acknowledgements/retransmissions are redundant if messages are lost or dropped on the backhaul 330.

Figure 6A:
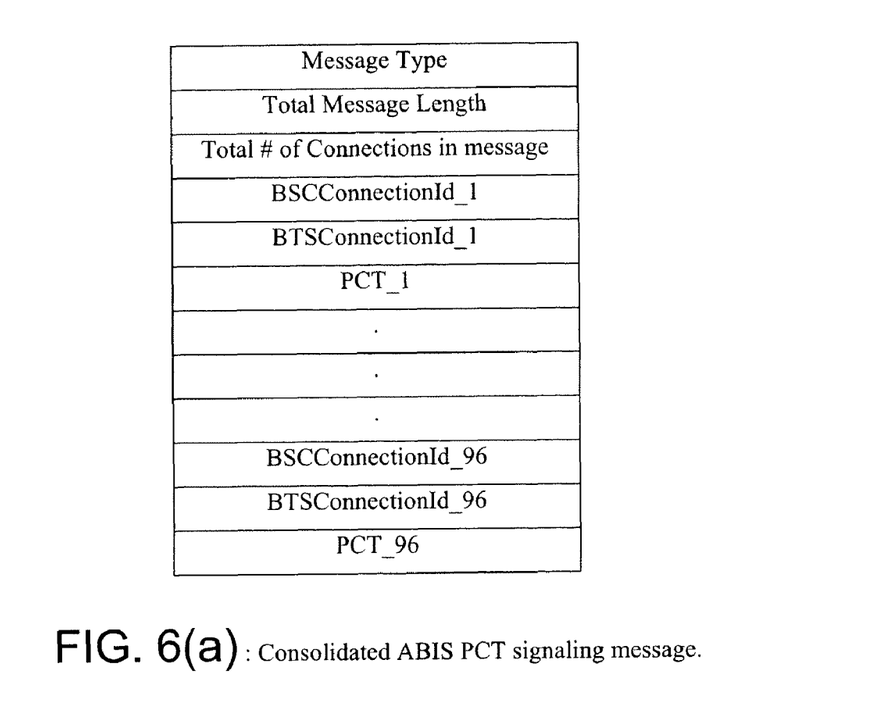
FIG. 6(a) depicts an example data structure of a message from RNC to RN.
Figure 6B:
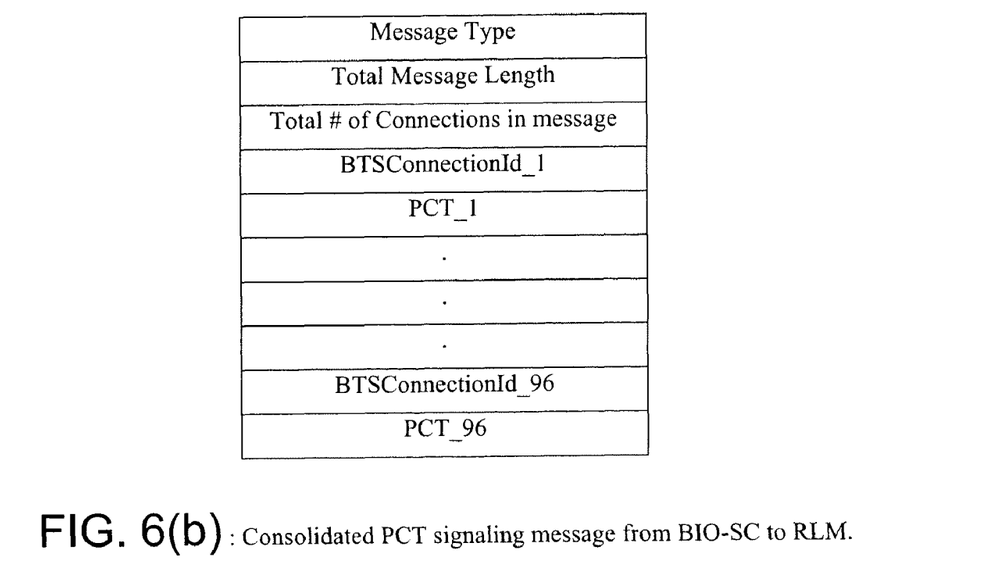
FIG. 6(b) depicts an example data structure of a message from RN-BIO-SC to RLM.

For a received message at RN-BIO-SC 515, the PCT message remapper 545 strips out the BSCConnectionId and sends the received message to the appropriate RLM card 435. Contents of this message are illustrated in FIG. 6(b). PCT demultiplexer 445 located on the RLM 435 populates the appropriate power control connection object 430 with $PCT_{RNC}$. For each connection, the decision module 425 chooses an appropriate PCT depending on the soft handoff count value. In scenarios (c) and (d), the soft handoff count>1 and hence $PCT_{RNC}$ is chosen. This value is written into the modem receiver and serves as current input to RLILPC 405.

We claim:

1. A method of performing reverse link power control in a mobile network by a first device that is configured to receive and to transmit signals to a wireless access terminal, the method comprising:

generating, using data from a first outer power control loop and data from a second outer power control loop, a power control command for a reverse link channel by performing functions comprising:

deriving, in the first outer power control loop executing on the first device, a first power control threshold value for reverse link power of the reverse link channel;

receiving, from a second device operating the second outer power control loop substantially simultaneously with the first outer power control loop, a second power control threshold value for reverse link power of the reverse link channel;

selecting the first power control threshold value, derived in the first outer power control loop executing on the first device, or the second power control threshold value, received from the second device operating the second outer power control loop, as a selected power control threshold value for the reverse link channel;

deriving, in an inner power control loop executing on the first device, the power control command for the reverse link channel from the selected power control threshold value; and transmitting, to the wireless access terminal, the power control command for the reverse link channel, wherein the first power control threshold value for the reverse link channel is derived independently of the second outer power control loop for the reverse link channel.

2. The method of claim 1, wherein selecting comprises selecting the second power control threshold value based on a state of a connection between the first device and the wireless access terminal.

3. The method of claim 2, wherein the state of the connection comprises the connection being in soft handoff.

4. The method of claim 1, wherein the second power control threshold value is selected when the second power control threshold value is received at the first device.

5. The method of claim 1, wherein the first power control threshold value is selected when a connection between the first device and the wireless access terminal is not in handoff or the connection is in softer handoff.

6. The method of claim 1, wherein the second power control threshold value is selected when a connection between the first device and the wireless access terminal is in soft handoff.

7. The method of claim 1, further comprising:
generating, by the first device, an indicator representing quality of a signal received from the wireless access terminal,
wherein the first power control threshold value and the second power control threshold value are derived using the indicator.

8. The method of claim 1, further comprising:
preventing sending of a packet from the first device to the second device if the packet is associated with a bad indication; and
sending the bad indication to the second device.

9. The method of claim 1, further comprising determining a good or a bad indication of a packet using a cyclic redundancy code (CRC) associated with the packet.

10. The method of claim 1, further comprising communicating between the first device and the second device using Internet Protocol (IP) or asynchronous transfer mode (ATM).

11. The method of claim 1, wherein the second device comprises two or more network control devices.

12. The method of claim 11, wherein receiving the second power control threshold value comprises:
receiving the second power control threshold value derived at a selected one of the two or more network control devices.

13. The method of claim 11, wherein selecting the second power control threshold value comprises:
selecting the second power control threshold value derived by a selected one of the two or more network control devices.

14. A system for performing reverse link power control of a reverse link channel, the system comprising:
a first device configured to use data from a first outer power control loop and data from a second outer power control loop to generate a power control command for the reverse link channel, the first device further configured to receive and to transmit signals to a wireless access terminal, to execute the first outer power control loop to derive a first power control threshold value for reverse link power of the reverse link channel, and to execute an inner power control loop to derive the power control command from a selected power control threshold value; and a second device configured to execute the second outer power control loop substantially simultaneously with the first power control loop to derive a second power control threshold value for reverse link power of the reverse link channel,
wherein the first device is configured to select the first power control threshold value, derived in the first outer power control loop executing on the first device, or the second power control threshold value, derived in the second outer power control loop executing on the second device, as the selected power control threshold value,
wherein the first device is configured to transmit the power control command for the reverse link channel to the wireless access terminal, and
wherein the first power control threshold value for the reverse link channel is derived independently of the second outer power control loop for the reverse link channel.

15. The system of claim 14, wherein the first device is configured to select the first power control threshold value or the second power control threshold value.

16. The system of claim 14, wherein the first device is configured to select the second power control threshold value when the second power control threshold value is received at the first device.

17. The system of claim 14, wherein the first device is configured to select the first power control threshold when a connection between the first device and the wireless access terminal is not in handoff or the connection is in softer handoff.

18. The system of claim 14, wherein the first device is configured to select the second power control threshold value when a connection between the first device and the wireless access terminal is in soft handoff.

19. The system of claim 14, wherein the first device is further configured to generate an indicator representing quality of a signal received from the wireless access terminal and to calculate the first power control threshold value using the indicator.

20. The system of claim 14, wherein the first device is further configured to prevent sending a packet from the first device to the second device if the packet is associated with a bad indication and to send the bad indication to the second device.

21. The system of claim 14, wherein the first device is further configured to determine a good or a bad indication of a packet using a cyclic redundancy code (CRC) associated with the packet.

22. The system of claim 14, wherein the first device and the second device are configured to communicate with each other using Internet Protocol (IP) or asynchronous transfer mode (ATM).

23. One or more non-transitory computer-readable storage media having instructions stored thereon that, when executed by one or more processing devices that are configured to receive and to transmit signals to a wireless access terminal in a mobile network, cause the one or more processing devices to:
generate, using data from a first outer power control loop and data from a second outer power control loop, a power control command for a reverse link channel by performing functions comprising:
deriving, in the first outer power control loop executing on said a first device, a first power control threshold value for reverse link power of the reverse link channel;
receiving, from a second device operating the second outer power control loop substantially simultaneously with the first outer power control loop, a second power control threshold value for reverse link power of the reverse link channel;

selecting the first power control threshold value, derived in the first outer power control loop executing on the first device, or the second power control threshold value, received from the second device operating the second outer power control loop, as a selected power control threshold value;

deriving, in an inner power control loop executing on the first device, the power control command for the reverse link channel from the selected power control threshold value; and transmitting to the wireless access terminal the power control command for the reverse link channel, wherein the first power control threshold value for the reverse link channel is derived independently of the second outer power control loop for the reverse link channel.

24. The one or more non-transitory computer-readable storage media of claim 23, wherein the second power control threshold value is selected when the second power control threshold value is received at the first device.

25. The one or more non-transitory computer-readable storage media of claim 23, wherein the first power control threshold value is selected when a connection between the first device and the wireless access terminal is not in handoff or the connection is in softer handoff.

26. The one or more non-transitory computer-readable storage media of claim 23, wherein the second power control threshold value is selected when a connection between the first device and the wireless access terminal is in soft handoff.

27. The one or more non-transitory computer-readable storage media of claim 23, wherein the instructions also cause the one or more processing devices to:

generate, by the first device, an indicator representing quality of a signal received from wireless access terminal; and calculate the first power control threshold value and the second power control threshold value using the indicator.

28. The one or more non-transitory computer-readable storage media of claim 23, wherein the instructions also cause the one or more processing devices to:

prevent sending a packet from the first device to the second device if the packet is associated with a bad indication; and send the bad indication to the second device.

29. The one or more non-transitory computer-readable storage media of claim 23, wherein the instructions also cause the one or more processing devices to:

determine a good indication or a bad indication of a packet using a cyclic redundancy code (CRC) associated with the packet.

30. The one or more non-transitory computer-readable storage media of claim 23, wherein the instructions also cause the one or more processing devices to:

cause the first device and the second device to communicate with each other using Internet Protocol (IP) or asynchronous transfer mode (ATM).

* * * * *

UNITED STATES PATENT AND TRADEMARK OFFICE
CERTIFICATE OF CORRECTION

PATENT NO. : 7,843,892 B2  Page 1 of 1
APPLICATION NO. : 10/835537
DATED : November 30, 2010
INVENTOR(S) : Sepehr Mehrabanzad It is certified that error appears in the above-identified patent and that said Letters Patent is hereby corrected as shown below:

Column 14, line 64, in claim 23, before "a first device" delete "said".

Signed and Sealed this
Fifteenth Day of March, 2011

David J. Kappos
*Director of the United States Patent and Trademark Office*